(12) United States Patent
Tsuda et al.

(10) Patent No.: US 7,598,001 B2
(45) Date of Patent: Oct. 6, 2009

(54) ALKALINE BATTERY, CURRENT COLLECTOR, ELECTRODE, AND METHOD OF MANUFACTURING ELECTRODE

(75) Inventors: Kazuya Tsuda, Koga (JP); Kunikazu Nagai, Koga (JP); Hiroyuki Imai, Akita (JP); Yoshitaka Mayuzumi, Akita (JP); Kazuya Sato, Oyama (JP); Toshiaki Takase, Sowa-machi (JP); Masanao Tanaka, Kazo (JP)

(73) Assignees: Sanoh Industrial Co., Ltd., Ibaraki (JP); JEMCO Inc., Akita (JP); Japan Vilene Company Ltd., Tokyo (JP)

( * ) Notice: Subject to any disclaimer, the term of this patent is extended or adjusted under 35 U.S.C. 154(b) by 818 days.

(21) Appl. No.: 11/143,933

(22) Filed: Jun. 3, 2005

(65) Prior Publication Data

US 2005/0277025 A1    Dec. 15, 2005

(30) Foreign Application Priority Data

Jun. 4, 2004    (JP) .............................. 2004-167669

(51) Int. Cl.
*H01M 4/74* (2006.01)
*H01M 4/80* (2006.01)

(52) U.S. Cl. .............................. 429/236; 29/2; 428/377; 428/379

(58) Field of Classification Search ................. 429/234, 429/235, 236; 29/2; 422/52, 377, 379; 428/52, 428/377, 379
See application file for complete search history.

(56) References Cited

U.S. PATENT DOCUMENTS

| | | | | |
|---|---|---|---|---|
| 2,616,165 | A | * | 11/1952 | Brennan ....................... 29/2 X |
| 4,370,214 | A | * | 1/1983 | Kadija ..................... 429/236 X |
| 5,156,899 | A | * | 10/1992 | Kistrup et al. .......... 429/235 X |
| 6,783,895 | B2 | * | 8/2004 | Imai et al. ................... 429/234 |
| 2001/0031402 | A1 | | 10/2001 | Imai et al. |

FOREIGN PATENT DOCUMENTS

| | | |
|---|---|---|
| CN | 131646 | 9/2001 |
| JP | 5-290838 | 11/1993 |
| JP | 8-329958 | 12/1996 |

* cited by examiner

*Primary Examiner*—Stephen J. Kalafut
(74) *Attorney, Agent, or Firm*—Morgan, Lewis & Bockius LLP

(57) ABSTRACT

An alkaline battery comprises an electrode. The electrode has a current collector and an active substance filled in the current collector. The current collector includes a nonwoven fabric fabricated from a plurality of fibers and a nickel-plating film formed on the plurality of fibers. A specific surface area per unit volume of the current collector is 0.13 m²/cm³-0.35 m²/cm³.

15 Claims, 4 Drawing Sheets

ALKALINE BATTERY, CURRENT COLLECTOR, ELECTRODE, AND METHOD OF MANUFACTURING ELECTRODE

BACKGROUND OF THE INVENTION

1. Field of the Invention

This invention relates to an alkaline battery, a current collector, an electrode, and a method of manufacturing an electrode.

2. Related Background Art

In the past, due to its reliability and weight-saving, the alkaline secondary battery was often used as a power supply for various pieces of equipment from portable devices to large-sized industrial equipment. In recent years, the use of devices which require high output, such as hybrid cars and power tools, is increasing, and alkaline secondary batteries which can provide a high current electric discharge are coming to be required. When used as an alkaline secondary battery for hybrid cars, high current electric discharge, high output per unit weight (weight-saving), and compactness are desired.

In order to obtain high output from such an alkaline secondary battery, a long, thin electrode is usually used. By making the electrode long and thin, its surface area increases, and the reaction resistance between the anode and the cathode falls, so high output is obtained. In another method, the current collector used in the alkaline secondary battery is given a three-dimensional structure, so the surface area of this current collector increases, the contact area between the active substance and this current collector increases, the current-collecting performance of the active material improves and high output is obtained.

For example, a current collector having a three-dimensional structure is known wherein electroconduction treatment and electrolysis plating treatment are given to a urethane foam sheet, and a foam nickel is then obtained by thermal decomposition of this urethane foam. Alternatively, as described in JP-A 08-329956, a three-dimensional mesh structure is known wherein only the surface of a nonwoven fabric is made conductive by giving a predetermined amount of nickel plating to a nonwoven fabric, manufactured by wet-laying organic fibers, without thermal decomposition/removal of this nonwoven fabric.

SUMMARY OF THE INVENTION

However, since the urethane foam is removed by thermal decomposition, a strength of foam nickel is weak, and as the foam nickel may fracture when the active substance is filled or the electrodes are manufactured, it is difficult to manufacture thin electrodes. Hence the thickness required of the electrode could not be guaranteed, and high output of the alkaline battery could not be obtained. For example, when foam nickel was used as the current collector of the anode, there was a limit to high output and weight-saving.

In the current collector disclosed by JP-A 08-329956, since there was a large amount of nickel plating given to the nonwoven fabric surface when the nonwoven fabric manufactured from thick fiber, the specific surface area was too narrow (at most 21 $m^2/m^2$, 0.04 $m^2/cm^3$ per unit volume), and output was inadequate.

It is therefore an object of the present invention, which was conceived in view of the aforesaid problems, to provide an alkaline battery in which high output is possible and a current collector, an electrode, and a method of manufacturing an electrode for an alkaline battery.

An alkaline battery according to the present invention comprises an electrode. The electrode has a current collector and an active substance filled in the current collector. The current collector includes a nonwoven fabric fabricated from a plurality of fibers and a nickel-plating film formed on the plurality of fibers. A specific surface area per unit volume of the current collector is 0.13 $m^2/cm^3$-0.35 $m^2/cm^3$.

Since the specific surface area per unit volume of current collector is 0.13 $m^2/cm^3$ or more, there is a large contact area between the active substance and this current collector, so the alkaline battery has an excellent current-collecting performance. Since it does not exceed 0.35 $m^2/cm^3$, the void ratio is not too small and the pore size is appropriate, so the current collector can be completely filled with the active substance. As a result, an alkaline battery which provides a high output is obtained.

The electrode is preferably obtained by filling the current collector with an active-substance paste having a viscosity of 0.3 Pa·s or less, and drying. Thus, even a small pore can be filled with the active-substance paste. Since the filling density of the active substance is high, an alkaline battery which provides a high output can be obtained.

The nonwoven fabric preferably includes thick fibers having a fineness of 6.6 dtex or more, and thin fibers having a fineness of 1.5 dtex or less. Since it includes thick fibers having a fineness of 6.6 dtex or more, a nonwoven fabric of suitable thickness with a high void ratio can be formed, and since it includes large pores even if the above thin fibers are included, it has excellent active substance filling properties. Moreover, since it includes thin fibers having a fineness of 1.5 dtex or less, there is a large contact area with the active substance and excellent current-collecting performance is obtained. As a result, a higher output is attained.

The nonwoven fabric preferably includes high Young's modulus fibers having a Young's modulus of 20 cN/dtex or more. Since these high Young's modulus fibers are strongly elastic towards bending, they can form a nonwoven fabric of suitable thickness with a high void ratio. Hence, due to the large pore size, the fabric has excellent active substance filling properties, and a higher output is attained.

A plating amount of the nickel-plating film is preferably 80 $g/m^2$-150 $g/m^2$. Since the nickel plating amount of the current collector is not less than 80 $g/m^2$, resistance is low and a current collector suitable for high current electric discharge is obtained. Also, since it is not more than 150 $g/m^2$, the pore size of the current collector is not too small due to the nickel plating, and excellent active substance filling properties are realized. As a result, an alkaline battery of higher output can be obtained.

A current collector according to the present invention comprises a nonwoven fabric fabricated from a plurality of fibers and a nickel-plating film formed on the plurality of fibers. The specific surface area per unit volume is 0.13 $m^2/cm^3$-0.35 $m^2/cm^3$.

The nonwoven fabric preferably includes thick fibers having a fineness of 6.6 dtex or more, and thin fibers having a fineness of 1.5 dtex or less.

The nonwoven fabric preferably includes high Young's modulus fibers having a Young's modulus of 20 cN/dtex or more.

A plating amount of the nickel-plating film is preferably 80 $g/m^2$-150 $g/m^2$.

An electrode according to the present invention comprises a current collector and an active substance filled in the current collector. The current collector has a nonwoven fabric fabricated from a plurality of fibers and a nickel-plating film formed on the plurality of fibers. A specific surface area per unit volume of the current collector is 0.13 $m^2/cm^3$-0.35 $m^2/cm^3$.

The active substance is preferably obtained by filling the current collector with an active substance paste having a viscosity of 0.3 or less Pa·s, and drying.

The nonwoven fabric preferably includes thick fibers having a fineness of 6.6 dtex or more, and thin fibers having a fineness of 1.5 dtex or less.

The nonwoven fabric preferably includes high Young's modulus fibers having a Young's modulus of 20 cN/dtex or more.

A plating amount of the nickel-plating film is preferably 80 g/m$^2$-150 g/m$^2$.

A method of manufacturing an electrode according to the present invention comprises preparing a current collector having a nonwoven fabric fabricated from a plurality of fibers and a nickel-plating film formed on the plurality of fibers, a specific surface area per unit volume of the current collector being 0.13 m$^2$/cm$^3$-0.35 m$^2$/cm$^3$, filling the current collector with an active-substance paste having a viscosity of 0.3 Pa·s or less, and drying the current collector filled with the active-substance paste.

The present invention will now be further described referring to the following detailed description and accompanying drawings. These are shown only for illustration and should not be construed as limiting the invention in any way.

DETAILED DESCRIPTION OF THE PREFERRED EMBODIMENTS

Figure 1:
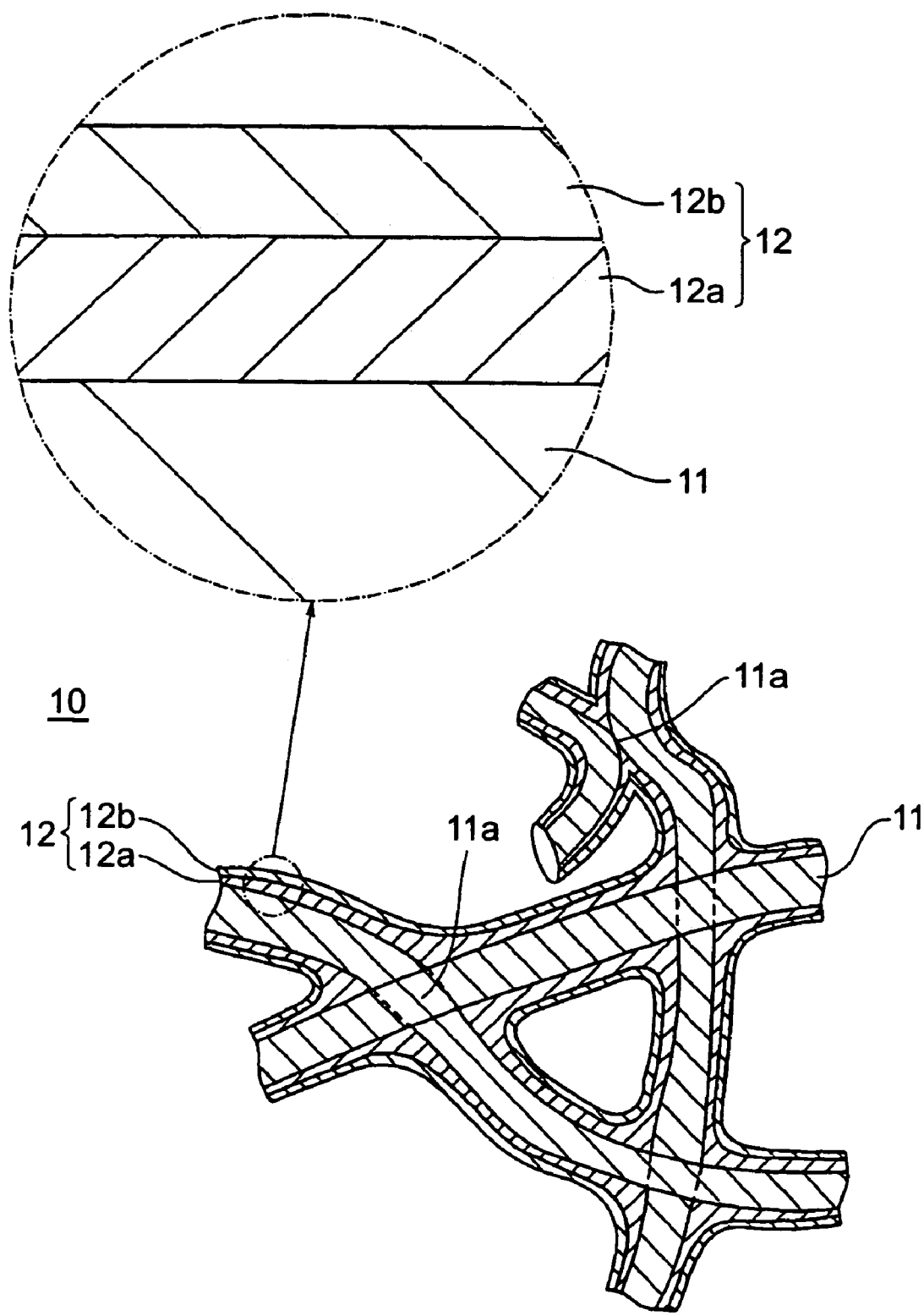
FIG. 1 is a partial enlargement of the current collector used for the alkaline battery of this aspect.

Hereafter, a suitable aspect of the alkaline battery relating to this invention will be described in detail referring to the accompanying drawings. In the description, identical elements are assigned identical symbols. Also, the dimensional ratio in the drawings does not necessarily coincide with that in the description.

FIG. 1 is a partial enlargement of the current collector used for the alkaline battery of this aspect.

As shown in FIG. 1, the current collector 10 used for the alkaline battery of this aspect comprises a nonwoven fabric 11 fabricated from a plurality of fibers and a nickel-plating film 12 formed on the surface of the plurality of fibers.

The resin ingredient of the fiber which constitutes the nonwoven fabric 11 is not critical, but it preferably comprises a polyolefin fiber and/or a polyamide fiber. This is because these fibers have a history of prior use as a separator of an alkaline battery, there is no change of physical properties even if they come in contact with 20-35 wt % KOH solution, and alkaline resistance is excellent.

The resin ingredient which constitutes the aforesaid polyolefin fiber may for example be polyethylene, polypropylene, polymethylpentene, ethylene propylene copolymer, ethylene-butene-propylene copolymer or ethylene-vinyl alcohol copolymer. The polyolefin fiber preferably comprises one or more types of these resin ingredients. It is more preferred that a polyethylene or polypropylene having excellent alkali resistance and acid resistance is also included in these resin ingredients. In particular, a sheath-core type conjugated fiber wherein the circumference of the polypropylene (core) is covered with polyethylene (sheath) has both alkali resistance and strength, and is therefore very suitable. The resin ingredient which constitutes the polyamide fiber may be for example nylon 6, nylon 66, nylon 12, or a copolymer of nylon 6 and nylon 12. The polyamide fiber preferably contains one or more types of these resin ingredients.

The nonwoven fabric 11 preferably contains crimped fibers. When the nonwoven fabric 11 comprises the crimped fibers, it has suitable thickness, the void volume and average pore size increase, and active substance filling properties are superior. The crimped fiber preferably has 3 crimps/inch or more, but more preferably 5 crimps/inch or more. The nonwoven fabric 11 preferably contains 5 mass % or more, more preferably 20 mass % or more and still more preferably 50 mass % or more of the crimped fibers by mass based on the nonwoven fabric. The crimped fiber may be crimped mechanically, or crimping can be produced by heat. Examples of fibers which can be crimped by heat include side-by-side fibers comprising two kinds of resin having different contraction temperatures, or sheath-core type fibers having an eccentric core.

The nonwoven fabric 11 may be manufactured by for example forming a fiber web by a dry-laid method such as the carding method, air-laid method, melt-blown method or spun-bonding method wherein a sheet is formed continuously from the spun state, or a wet-laid method wherein fibers are dispersed in water and laid, and the fibers are then combined together. The nonwoven fabric 11 manufactured from a fiber web obtained by the wet-laid method, in comparison to the nonwoven fabric 11 manufactured from a fiber web obtained by the dry-laid method, has little unevenness of weight per unit area and thickness, so a uniform current collector 10 can be manufactured. Hence, if this current collector 10 is used, an electrode of uniform thickness can be formed. By winding this electrode, an electrode group having superior adhesion properties can be formed, and an alkaline battery having high current discharge can be manufactured.

The fiber web combining method may be for example entangling treatment or heat treatment. The entangling treatment may be for example water-jet entangling treatment wherein the fiber web is given an impact by very fine water jets, or a needle punching method. If this entangling treatment is applied, the fibers becoming entangled so that contact points 11a between the fibers increase, which increases the mechanical strength of the nonwoven fabric 11 and permits adjustment of the void ratio to a suitable value.

On the other hand, in heat treatment, the mutual contact points 11a of the fibers are fused to each other so that the mechanical strength of the nonwoven fabric 11 increases. The heat treatment temperature is not particularly limited, but the temperature is sufficient to cause the component fibers of the fiber web not to thermally decompose and cause the fibers to fuse to each other. For example, when the fiber web contains a sheath-core type conjugated fiber wherein polypropylene is surrounded by polyethylene, it is preferable to heat-treat at a temperature of 110° C.-140° C. Also, the fiber web can be combined by entangling treatment or by heat treatment, but if heat treatment is performed after entangling treatment, the mechanical strength of the obtained nonwoven fabric 11 increases remarkably, which is preferable.

Moreover, for the nonwoven fabric 11, the void ratio (percentage of the pores to the total volume of the nonwoven fabric) is 70%-98%. If the void ratio is smaller than 70%, since the filling density of the active-substance paste is low, there is a tendency for the battery manufactured using this nonwoven fabric 11 to have a low theoretical capacity, and for high capacity to be no longer obtained with high current and electric discharge. On the other hand, if the void ratio is larger than 98%, the mechanical strength of the nonwoven fabric 11 tends to be too low. The void ratio is more preferably 80 to 98%.

The nonwoven fabric 11 is preferably subjected to hydrophilic treatment. This is because, by performing hydrophilic treatment, the adhesion of the nonwoven fabric 11 to the nickel-plating film 12 improves, the surface resistance of the nickel-plating film 12 falls, and high current charge/discharge become possible. In particular, when a polyolefin fiber is included as a component fiber of the nonwoven fabric 11, it has poor affinity with the plating solution, and since adhesion between the surface of the nonwoven fabric 11 and the nickel-plating film 12 is poor, it is preferable to perform hydrophilic treatment of the nonwoven fabric 11.

This hydrophilic treatment may for example be sulfonation treatment, fluorine gas treatment, vinyl monomer graft treatment, surfactant treatment, treatment to adhere hydrophilic resin or electric discharge treatment. In particular, with sulfonation treatment or fluorine gas treatment, even in 20 wt %-35 wt % potassium hydroxide aqueous solution which is used as an electrolyte solution in alkaline batteries, there is no dropout of the nickel-plating film 12 nor rise of surface resistance over a long period of time, which is preferred.

The sulfonation treatment is not particularly limited, but may for example involve immersing the nonwoven fabric 11 in fuming sulfuric acid, sulfuric acid, sulfur trioxide, chlorosulfuric acid or sulfuric chloride. Among these, in sulfonation treatment by fuming sulfuric acid, reactivity is high and sulfonation is relatively easy to perform, so this method is preferred. Fluorine gas treatment is not particularly limited, and may be performed for example by exposing the nonwoven fabric 11 to a gas mixture containing fluorine gas diluted with an inert gas (for example, nitrogen gas, argon gas, etc.) and at least one gas selected from a group consisting of oxygen gas, carbon dioxide gas and sulfur dioxide gas. If the nonwoven fabric 11 is exposed to fluorine gas after making sulfur dioxide gas adhere to the nonwoven fabric 11 beforehand, the hydrophilic treatment can be performed more efficiently and with longer-lasting effect.

The current collector 10 is formed by giving a plating treatment to the aforesaid nonwoven fabric 11. This plating treatment is preferably given by electroless plating, but as shown in FIG. 1, it is preferable to form a plating film 12b by electrolysis plating on an electroless plating film 12a formed by electroless plating if required. As a result, the nonwoven fabric 11 is covered by the nickel-plating film 12.

Specifically, the electroless plating method involves a catalyzing step and an electroless plating step. The catalyzing step may be accomplished by catalyst conversion wherein the nonwoven fabric 11 is treated by an aqueous hydrochloric acid solution of stannous chloride and then an aqueous hydrochloric acid solution of palladium chloride, or by a method wherein the nonwoven fabric is catalyzed only by an aqueous hydrochloric acid solution of palladium chloride containing an amino group of a hardening agent, but the former method is preferred from the viewpoint that the plating film thickness is uniform.

By contrast, in electroless plating step, nickel is reduced by a reducing agent in an aqueous solution generally containing a nickel salt such as nickel nitrate, nickel chloride or nickel sulfate, and may if required further containing a complexing agent, pH modifier, buffer or stabilizer. To form a nickel plating film 12a of high purity, it is preferable to use a hydrazine derivative such as hydrated hydrazine, hydrazine sulfate or hydrazine oxide as the reducing agent. The electroless plating can be performed by a continuous progression from the catalyzing step to the electroless plating step while winding the long nonwoven fabric 11. The nonwoven fabric 11 wound into a roll may also be forcibly subjected to a catalyzing step and/or electroless plating step using a cheese dying machine.

As mentioned above, after forming the electroless plating film 12a on the nonwoven fabric 11 by electroless plating, it is preferred that an electrolysis plating film 12b is further formed by electrolysis plating. This electrolysis plating can be performed using a plating bath. As a plating bath, a Watts bath, chloride bath or sulfamic acid bath, etc. can be used. To the plating bath may be added a pH buffer and additives, such as an interface buffer. After connecting the nonwoven fabric which has received electroless plating to the cathode, and the nickel counter electrode plate to the anode in the plating bath, respectively, the electrolysis plating film 12b can be formed on the electroless plating film 12a by passing a direct current or a pulse interrupted current. The current collector 10 is thereby obtained.

The specific surface area per unit volume of the current collector 10 used for the alkaline battery of this aspect is in the range of $0.13$ $m^2/cm^3$-$0.35$ $m^2/cm^3$. If the specific surface area per unit volume is less than $0.13$ $m^2/cm^3$, the contact area of the nickel-plating film 12 and the active substance is insufficient, and so the alkaline battery has a bad current-collecting performance, it is difficult to obtain high output. Therefore it is preferably not less than $0.15$ $m^2/cm^3$ and more preferably not less than $0.20$ $m^2/cm^3$. On the other hand, if the specific surface area per unit volume exceeds $0.35$ $m^2/cm^3$, the void ratio is too small and the pore size is small, so the filling ratio of the active substance decreases and it is difficult to obtain high output. It is therefore preferably not more than $0.33$ $m^2/cm^3$, and more preferably not more than $0.30$ $m^2/cm^3$.

As mentioned above, the current collector 10 which has the specific surface area per unit volume in the range of $0.13$ $m^2/cm^3$-$0.35$ $m^2/cm^3$ can be manufactured as follows. Specifically, it can be manufactured by a suitable combination of factors such as including a suitable amount of thin fibers of 1.5 dtex or less as a component fiber of the nonwoven fabric 11, including a proper amount of thick fibers of 6.6 dtex or more as a component fiber of the nonwoven fabric 11, including a proper amount of fibers with a high Young's modulus as a component fiber of the nonwoven fabric 11, including a proper amount of the aforesaid crimped fibers as a component fiber of the nonwoven fabric 11, and using a suitable nickel plating amount. The specific surface area per unit volume (Sd) is a value computed by the following formula using the specific surface area (Ss, units:$m^2/g$) by a BET method to use adsorption of krypton, and the apparent density (D, units: $g/cm^3$) of the nonwoven fabric.

$$Sd=Ss \cdot D$$

The current collector 10 preferably has a void ratio (percentage of the pores to the total volume of the current collector) of 70 to 97%. If the void ratio is smaller than 70%, the theoretical capacity of the battery becomes lower since the filling density of the active substance paste is low, and high capacity with high current electric discharge tends to be no longer obtained. On the other hand, if the void ratio is larger than 97%, there are few intersections of the fibers of the nonwoven fabric 11, the strength of the current collector 10 is low, and fractures easily occur. A more preferable void ratio is in the range of 80 to 95%.

The component fibers of the nonwoven fabric 11 preferably include thin fibers of 1.5 dtex or less, more preferably thin fibers of 1 dtex or less, and still more preferably thin fibers of 0.8 dtex or less. In this case, the surface area is large and the contact area with the active substance is large, so the internal resistance falls, superior current-collecting performance is realized and higher output is attained. The fineness of the thin fibers is not particularly limited, but about 0.03 dtex is suitable. These thin fibers are preferably contained to the extent of 10 mass % or more, and more preferably 20 mass % or more, in the nonwoven fabric.

When many of the aforesaid thin fibers are included, the pore size becomes small, and active substance filling properties deteriorate. Therefore, the nonwoven fabric 11 preferably contains thick fibers of 6.6 dtex or more, more preferably 10 dtex or more and still more preferably 12 dtex or more as component fibers in addition to the aforesaid thin fibers. In this way, the nonwoven fabric 11 having a suitable thickness with a high void ratio can be formed. Due to the large pore size, the nonwoven fabric 11 has superior active substance filling properties. The nonwoven fabric preferably contains 5 mass % or more, but more preferably 10 mass % or more of these thick fibers.

The component fibers of the nonwoven fabric 11 preferably include fibers having a high Young's modulus of 20 cN/dtex or more. Due to this, the nonwoven fabric 11 is not easily crushed during manufacture of the nonwoven fabric 11 and when it is rolled up in order to plate the nonwoven fabric 11. Furthermore, the nonwoven fabric 11 is not easily crushed by the pressure applied when the plating solution is passed in. Accordingly its thickness is maintained, void ratio is high and pore size is large. Moreover, the current collector 10 is not easily crushed by the pressure applied when the active substance is filled, and a large amount of active substance can be filled. By using the current collector 10 having superior active substance filling properties, a higher output is attained.

Since performance is better the higher Young's modulus is, Young's modulus is preferably 30 cN/dtex or more. The upper limit of Young's modulus is not particularly limited, but it is preferably 100 cN/dtex or less. This is because when Young's modulus exceeds 100 cN/dtex, the fibers become too rigid to bending, the fibers do not easily entangled and it is difficult to form a fiber web. These high Young's modulus fibers are preferably contained in the nonwoven fabric to the extent of 5 mass %, but more preferably 10 mass % or more. "Young's modulus" is an apparent Young's modulus value computed from the initial tensile resistance measured by the method specified in JIS L 1015: 1999, Clause 8.11.

The nickel plating amount of the nickel-plating film 12 in the current collector 10 is preferably 80 g/m$^2$-150 g/m$^2$. If the nickel plating amount is not less than 80 g$^2$, resistance is low, a current collector suitable for high current electric discharge is obtained, and a battery suitable for high current electric discharge can be easily manufactured. The nickel plating amount is more preferably 100 g/m$^2$ or more, and still more preferably 110 g/m$^2$ or more. If the nickel plating amount does not exceed 150 g/m$^2$, the pore size of the current collector is not too small due to the nickel plating, so superior active substance filling properties and higher output are attained. Thus, it is easy to manufacture a high output battery. The nickel plating amount is preferably 130 g/m$^2$ or less.

The alkaline battery of this aspect has an electrode obtained by filling the current collector 10 with the active-substance paste, and drying. The viscosity of the paste is preferably 0.3 Pa·s or less. By arranging the viscosity of the paste to be 0.3 Pa·s or less, even fine pores can be filled up with paste. As a result, a filling density of the paste becomes high, and an electrode which provides a high output can be obtained. The viscosity of the paste is more preferably 0.01 Pa·s or more. The paste can then be filled without flowing down. The viscosity of the paste is more preferably 0.2 Pa·s or less. Herein, "viscosity" is a value measured by a viscosity cup.

The active substance may for example be nickel hydroxide, and the active-substance paste may contain cobalt or nickel powder as an electrically conducting agent in addition to the active substance. The filling density of the active-substance paste in the aforesaid electrode is not particularly limited, but is preferably 1.4 g/cm$^3$-2.5 g/cm$^3$.

The aforesaid electrode can be manufactured by filling the voids of the current collector 10 with the active-substance paste (in the case of the anode, an anode active substance paste, and in the case of the cathode, a cathode active-substance paste), and then drying and rolling. To manufacture a battery using this electrode, an external current-collecting terminal is welded to part (if belt-shaped, the long side) of the electrode (for example, by seam welding, spot welding, etc.). This external current-collecting terminal may be an expanded metal ribbon or nickel piece, but an expanded metal ribbon is preferred. This is because the weld between the electrode and terminal is strong, and low resistance with high current electric discharge are easily obtained.

Figure 2:
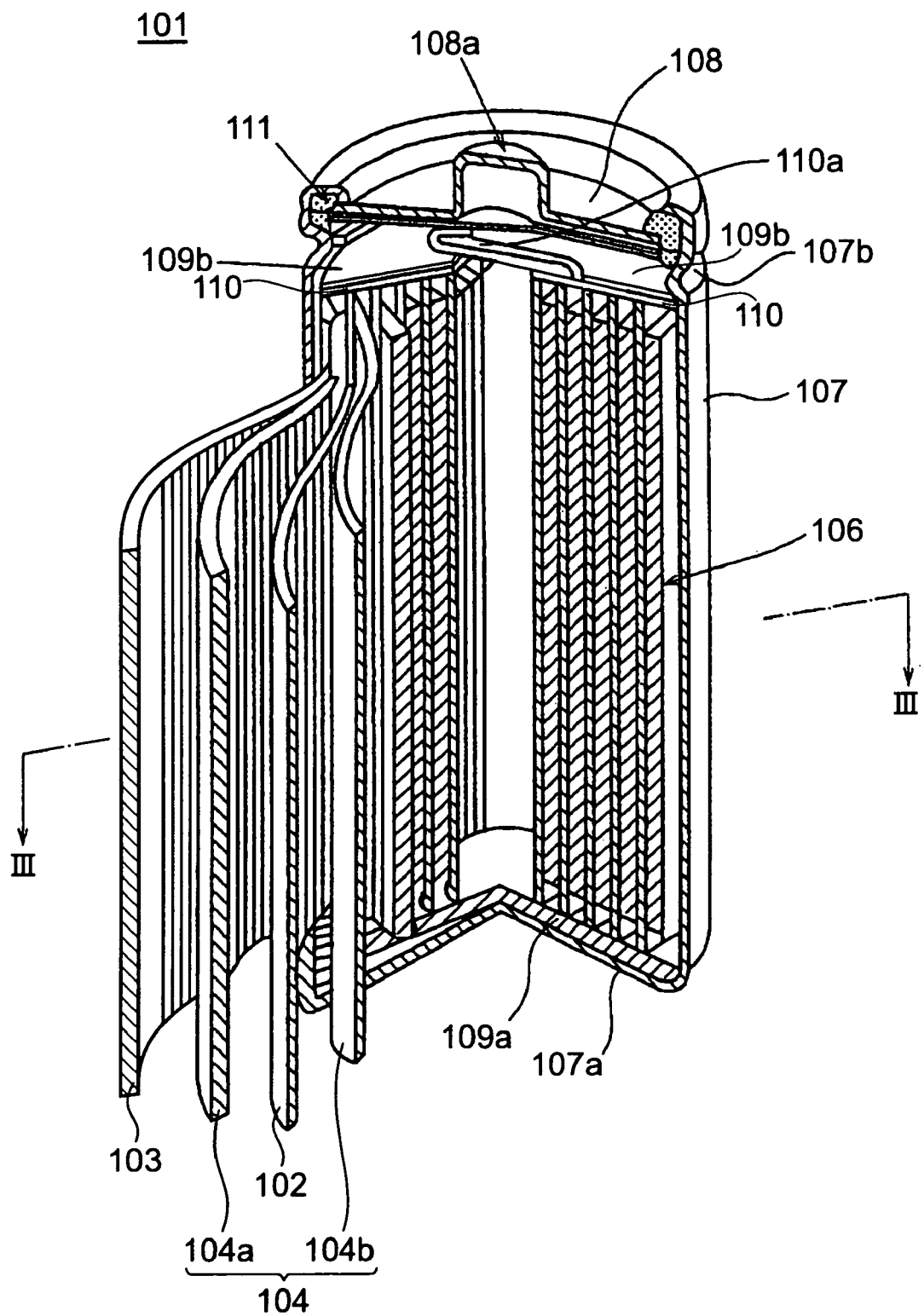
FIG. 2 is a perspective diagram of the nickel-hydrogen battery of this aspect showing part cut away.

The alkaline battery of this aspect has an electrode formed using the current collector 10. Hence, an alkaline battery which can provide high output is obtained. A nickel-hydrogen battery which is typical among the alkaline batteries of this aspect will now be described referring to FIG. 2. FIG. 2 is a perspective view showing part of the nickel-hydrogen battery 101 of this aspect cut away.

As shown in FIG. 2, the nickel-hydrogen battery 101 is provided with a roll-like electrode group 106, a battery case 107 housing the roll-like electrode group 106, and a sealing plate 108 sealing the battery case 107 and functioning as a positive terminal.

The roll-like electrode group 106 comprises an anode 102 and cathode 103 which are belt-shaped electrodes, a first separator 104a installed between the anode 102 and the cathode 103, and a second separator 104b interposed on the inner side of the positive terminal 102. Due to the first separator 104a and second separator 104b, this electrode group 106 prevents short circuits of the anode 102 and cathode 103, and also holds an electrolytic solution.

The battery case 107 is formed in the shape of a cylinder with a can base 107a, and the sealing plate 108 is arranged to seal the opening of the upper end of the battery case 107. The battery case 107 can accommodate the roll-like electrode group 106 such that the cathode 103 contacts the inner circumferential surface. Also, a projection 108a which forms the anode terminal of the battery 101 is formed in the center of the sealing plate 108. A lower insulator 109a is installed between the can base 107a and the electrode group 106, and an upper insulator 109b is installed at the upper end of the electrode group 106. The battery case 107 also has conductivity and functions as a cathode.

A slit through which an external current-collecting terminal which is welded to the cathode 103 can be passed, is formed in the lower insulator 109a, and a slit through which a current-collecting plate terminal 110a of a current-collecting plate 110 can be passed, which is also welded to an external current-collecting terminal welded to the anode 102, is formed in the upper insulator 109b. The external current-collecting terminal welded to the cathode 103 projects through the slit formed in the lower insulator 109a on the side of the can base 107a, and the current-collecting terminal 110a projects through the slit formed in the upper insulator 109b on the side of the sealing plate 108. The external current-collecting terminal which projects from the slit of the lower insulator 109a, is connected to the can base 107a, and the external current-collecting terminal 110a which projects from the slit of the upper insulator 109b is connected to the sealing plate 108.

With the upper insulator 109b inserted in the battery case 107, a ring-like constricted part 107b is formed in the upper part near the opening of the battery case 107, and the sealing plate 108 is arranged in the constricted part 107b through a ring-like insulation packing 111. Thereby, the sealing plate 108 is electrically insulated from the battery case 107, and the battery case 107 is sealed by the sealing plate 108.

Figure 3:
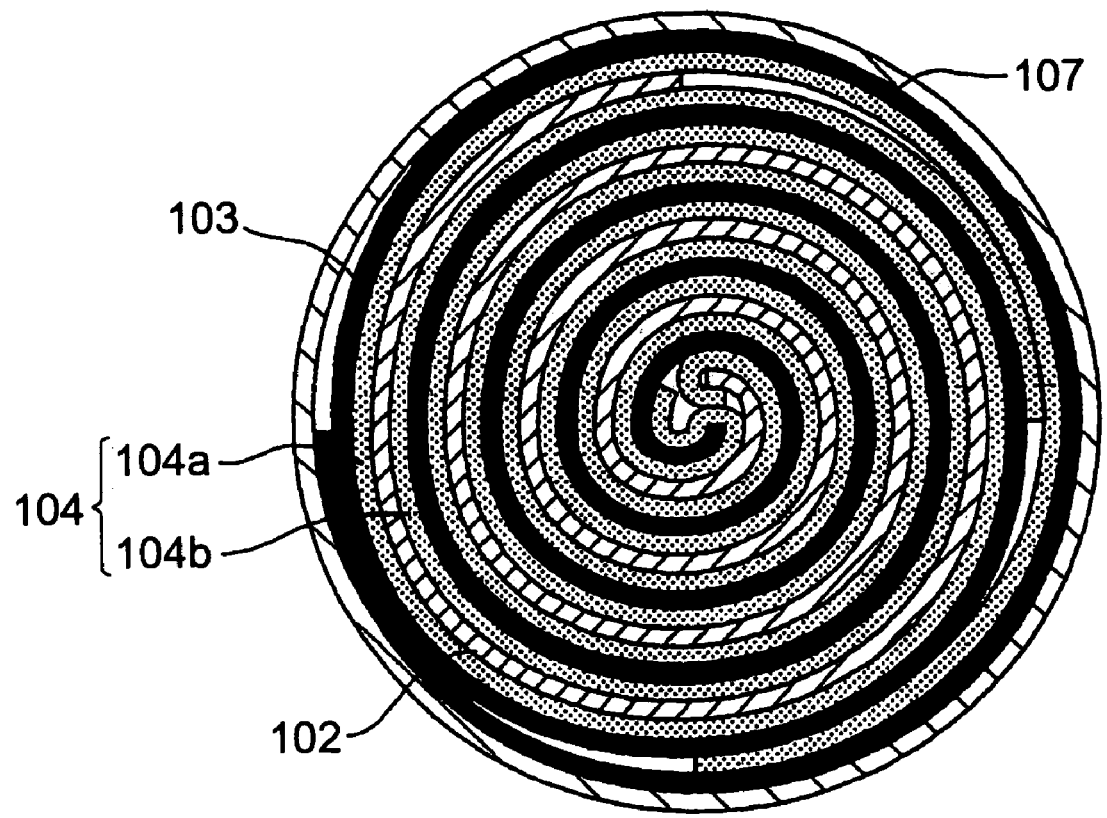
FIG. 3 is a cross-sectional view of FIG. 2 through a line III-III in FIG. 2.

As shown in FIG. 2, in the nickel-hydrogen battery 101 having the aforesaid construction, the second separator 104b, anode 102, first separator 104a and cathode 103 are laminated in this order. As shown in FIG. 3, the roll-like electrode group 106 is manufactured by winding these elements laminated in this way in a roll shape so that the cathode 103 is on the outside. Next, the action and effect of the alkaline battery relating to this aspect will be described.

In the alkaline battery relating to this aspect, since the specific surface area per unit volume of the current collector 10 is 0.13 m$^2$/cm$^3$-0.35 m$^2$/cm$^3$, the contact area between the active substance and the current collector 10 is large, so its current-collecting performance is excellent, and since it has a suitable pore size, it can be completely filled with the active substance. Further, since the viscosity of the active-substance paste is 0.3 Pa·s or less, even minute pores in the current collector 10 can be filled with the active-substance paste, and the filling density of the active-substance paste is high. The alkaline battery using this current collector 10 therefore provides a high output.

Since the component fibers of the nonwoven fabric with which the current collector 10 is provided, include thick fibers of 6.6 dtex or more, a nonwoven fabric of suitable thickness having a high void ratio can be formed, and it has superior active substance filling properties. Moreover, since they include thin fibers of 1.5 dtex or less, the contact area with the active substance is large, and it has superior current-collecting performance. A higher output is therefore attained.

The component fibers of the aforesaid nonwoven fabric include fibers with a high Young's modulus of 20 cN/dtex or more, and since these high Young's modulus fibers have strong elasticity when bent, the current collector 10 has a suitable thickness and a high void ratio. Therefore, the current collector has superior active substance filling properties, and a higher output is attained.

Since the nickel plating amount on the nonwoven fabric is 80 g/m$^2$-150 g/m$^2$, the resistance is low and a suitable current collector for high current electric discharge is obtained. Moreover, since the pore size of the current collector is not too small due to the nickel plating, it has superior active substance filling properties. A higher output is therefore attained.

Since the nickel amount used is less than when using foam nickel as the starting material of the current collector 10, costs can be reduced. Further, since it is not necessary to sinter the nonwoven fabric which received nickel-plating treatment, the process used to manufacture the current collector 10 can be simplified and costs can be cut down.

Hereafter, the present invention will be described in further detail referring to specific examples and comparative examples, but the invention is not to be construed as being limited in any way thereby.

EXAMPLES

Example 1

(Manufacture of Current Collector)

A fiber web was formed by usual wet-laid method using a slurry containing a dispersion of 50 mass % of sheath-core type, high Young's modulus conjugated thick fibers having a polypropylene core and a high-density polyethylene sheath, fineness 6.6 dtex, fiber length 5 mm and Young's modulus 30 cN/dtex, and 50 mass % of sheath-core type, high Young's modulus conjugated thin fibers having a polypropylene core and a high-density polyethylene sheath, fineness 0.8 dtex, fiber length 5 mm and Young's modulus 42 cN/dtex.

This fiber web was heat-treated with a drier set at a temperature of 135° C., and the high-density polyethylene which is the sheath of both sheath-core type, high Young's modulus conjugated fibers was fused to manufacture a nonwoven fabric of weight per unit area 70 g/m$^2$ and thickness 0.5 mm. The void ratio in this nonwoven fabric was 82%.

Next, sulfonation treatment was performed by immersing this nonwoven fabric in fuming sulfiric acid at a temperature of 80° C. Electroless nickel-plating treatment was then performed on the obtained sulfonated nonwoven fabric to manufacture the current collector (weight per unit area: 185 g/m$^2$, thickness: 0.5 mm) used for the alkaline battery of this aspect.

The electroless nickel-plating treatment was performed as follows. The sulfonated nonwoven fabric was wound around a dyeing machine carrier, a refining agent was circulated through, and washed out with water. Next, an aqueous solution containing 10 g/l of stannous chloride and 20 ml/l of hydrocholoric acid was circulated through, and washed out with water. Next, an aqueous solution containing 1 g/l palladium chloride and 20 ml/l of hydrochloric acid was circulated through, catalyzed, and washed out with water. Next, an electroless nickel-plating solution containing 18 g/l nickel sulfate, 109 g/l sodium citrate, 50 ml/l of hydrated hydrazine and 100 ml/l of 25% ammonia solution was heated to a temperature of 80° C., and circulated through. This was circulated for 1 hour and after the plating solution became almost transparent, the circulation was stopped, the sulfonated nonwoven fabric was taken out and washed with water, and dried to complete the electroless nickel-plating treatment.

(Manufacture of Anode)

The current collector manufactured as described above was cut to a size of 9 cm×37 cm, and an expanded metal was seam welded to both of the long sides. Next, the seam-welded current collector was impregnated with an anode active substance paste using nickel hydroxide as the main material, containing 10 mass percent of cobalt powder and having a viscosity of 0.1 Pa·s so that the current collector was filled with the anode active substance paste, and excess anode active substance paste on the surface of the current collector was removed by passing the current collector between slit plates having the same interval as the thickness of the current collector. Next, the current collector filled with this anode active substance paste was dried in a drier at 60° C. for 60 minutes, rolled out to a thickness of 0.27 mm by a roll press, and cut to a size of 4 cm×35 cm. In this way, two anodes were manufactured.

(Manufacture of Cathode)

A cathode was manufactured by preparing an alloy paste containing a mixture of 90% hydrogen occlusion alloy and 10% aqueous solution of 1% CMC (sodium carboxymethyl cellulose), filling the paste, drying, adjusting thickness and seam-welding a nickel ribbon on a current collector comprising foam nickel in an identical procedure to the above anode manufacturing procedure.

(Manufacture of Battery)

A C size-compliant roll-like electrode group was manufactured by gripping a separator between the anode and cathode electrode manufactured as described above, and winding in a spiral. The electrode group was manufactured by introducing the two anodes one after another in order so that the anode length was 70 cm. This electrode group was placed in a battery case, and 5N potassium hydroxide and 1N lithium hydroxide were injected into the battery case as an electrolytic solution. Next, a current-collecting plate was welded to the expanded metal of the anode, this current-collecting plate was welded to the sealing plate, and the battery case was sealed by this sealing plate to give a cylindrical C size nickel-hydrogen battery. The separator was a hydrophically-treated nonwoven fabric obtained by sulfonation treatment of a wet-laid and fused nonwoven fabric of sheath-core type conjugated fibers (fineness: 2.2 dtex, fiber length: 5 mm) comprising a polypropylene core and a polyethylene sheath.

Example 2

A current collector was manufactured in an identical way to that of Example 1, except that 70 mass % of sheath-core type, high Young's modulus conjugated thick fibers having a polypropylene core and a high-density polyethylene sheath, fineness 6.6 dtex, fiber length 5 mm and Young's modulus 30 cN/dtex, and 30 mass % of sheath-core type, high Young's modulus conjugated thin fibers having a polypropylene core and a high-density polyethylene sheath, fineness 0.8 dtex, fiber length 5 mm and Young's modulus 42 cN/dtex, was used as the fiber starting material for the current collector. Subsequently, an anode was manufactured in an identical way to that of Example 1. A cylindrical C size nickel-hydrogen battery was also manufactured in an identical way to that of Example 1.

Example 3

A current collector was manufactured in an identical way to that of Example 1, except that 10 mass % of sheath-core type, high Young's modulus conjugated thick fibers having a polypropylene core and a high-density polyethylene sheath, fineness 6.6 dtex, fiber length 5 mm and Young's modulus 30 cN/dtex, and 90 mass % of sheath-core type, high Young's modulus conjugated thin fibers having a polypropylene core and a high-density polyethylene sheath, fineness 0.8 dtex, fiber length 5 mm and Young's modulus 42 cN/dtex, was used as the fiber starting material for the current collector. Subsequently, an anode was manufactured in an identical way to that of Example 1. A cylindrical C size nickel-hydrogen battery was also manufactured in an identical way to that of Example 1.

Comparative Example 1

A current collector was manufactured in an identical way to that of Example 1, except that 80 mass % of sheath-core type, high Young's modulus conjugated thick fibers having a polypropylene core and a high-density polyethylene sheath, fineness 6.6 dtex, fiber length 5 mm and Young's modulus 30 cN/dtex, and 20 mass % of sheath-core type, high Young's modulus conjugated thin fibers having a polypropylene core and a high-density polyethylene sheath, fineness 0.8 dtex, fiber length 5 mm and Young's modulus 42 cN/dtex, was used as the fiber starting material for the current collector. Subsequently, an anode was manufactured in an identical way to that of Example 1. A cylindrical C size nickel-hydrogen battery was also manufactured in an identical way to that of Example 1.

Comparative Example 2

A current collector was manufactured in an identical way to that of Example 1, except that 100 mass % of sheath-core type, high Young's modulus conjugated thin fibers having a polypropylene core and a high-density polyethylene sheath, fineness 0.8 dtex, fiber length 5 mm and Young's modulus 25 cN/dtex, was used as the fiber starting material for the current collector. Subsequently, an anode was manufactured in an identical way to that of Example 1. A cylindrical C size nickel-hydrogen battery was also manufactured in an identical way to that of Example 1.

Comparative Example 3

An anode was manufactured in an identical way to that of Example 1, except that foam nickel of thickness 1 mm was used as the starting material for the anode current collector. A cylindrical C size nickel-hydrogen battery was also manufactured in an identical way to that of Example 1.

Comparative Example 4

An anode was manufactured in an identical way to that of Example 1, except that when the anode current collector was manufactured, electroless nickel plating treatment was applied until the nickel plating amount was 350 g/m$^2$. A cylindrical C size nickel-hydrogen battery was also manufactured in an identical way to that of Example 1.

(Evaluation of Battery Performance)

The performance of the current collector or nickel-hydrogen battery in Examples 1-3 and Comparative Examples 1-4 was evaluated by the following methods. Table 1 shows the results of the performance evaluation.

(1) Specific Surface Area Per Unit Volume:

The specific surface area per unit volume of each current collector (Sd, units: m$^2$/cm$^3$) was computed using the specific surface area (Ss, units: m$^2$/g) by a BET method to use adsorption of krypton, and the apparent density (D, units: g/cm$^3$) of the nonwoven fabric, by the following formula. The apparent density of the nonwoven fabric was computed by dividing the weight per unit area (g/cm$^2$) of the nonwoven fabric by the thickness (cm) of the nonwoven fabric.

(2) Nickel Plating Amount:

Samples were prepared by cutting the current collector into a size of 10 cm×10 cm, and the mass (R, units: g) was measured. Next, the nickel plating of the current collector was dissolved by stirring these samples in concentrated hydrochloric acid. After the nickel plating was completely removed, the nonwoven fabric was washed, dried, and the mass (S, units: g) was measured. From these results, the nickel plating amount per m$^2$ (M, units: g/m$^2$) was computed by the following formula.

$$M=(R-S)\cdot 100$$

(3) Void Ratio:

The void ratio (P, units: %) of the current collector was computed by the following formula.

$$P=\{1-W/(t\cdot d)\}\cdot 100$$

Here, W (g/m$^2$) is the weight per unit area of the current collector, t (μm) is the thickness of the current collector, and d (g/cm$^3$) is the density of the fibers which were nickel-plated, respectively (4) Theoretical Capacity:

The theoretical capacity (units: mAh) was computed by multiplying the mass (g) of nickel hydroxide filled in the current collector of the anode, by 289.

(5) Maximum Output Density:

The nickel-hydrogen battery was activated (considering 0.1 C-12 hour charge and discharge to 0.1 C-1V as 1 cycle, 5 cycles), and charged at 0.1 C for 10 hours which was considered as the fully charged state. 1 C discharge was performed for 30 minutes, which was considered as 50% discharge depth. It was then discharged at 5 C from 50% discharge depth, and the voltage at 10 seconds after starting discharge was measured. Next, from the fully charged state, it was discharged to a depth of 50%, discharged at 10 C from 50% discharge depth, and the voltage at 10 seconds after starting discharge was measured. Further, from the fully charged state, it was discharged to a depth of 50%, discharged at 15 C from 50% discharge depth, and the voltage at 10 seconds after starting discharge was measured.

Figure 4:
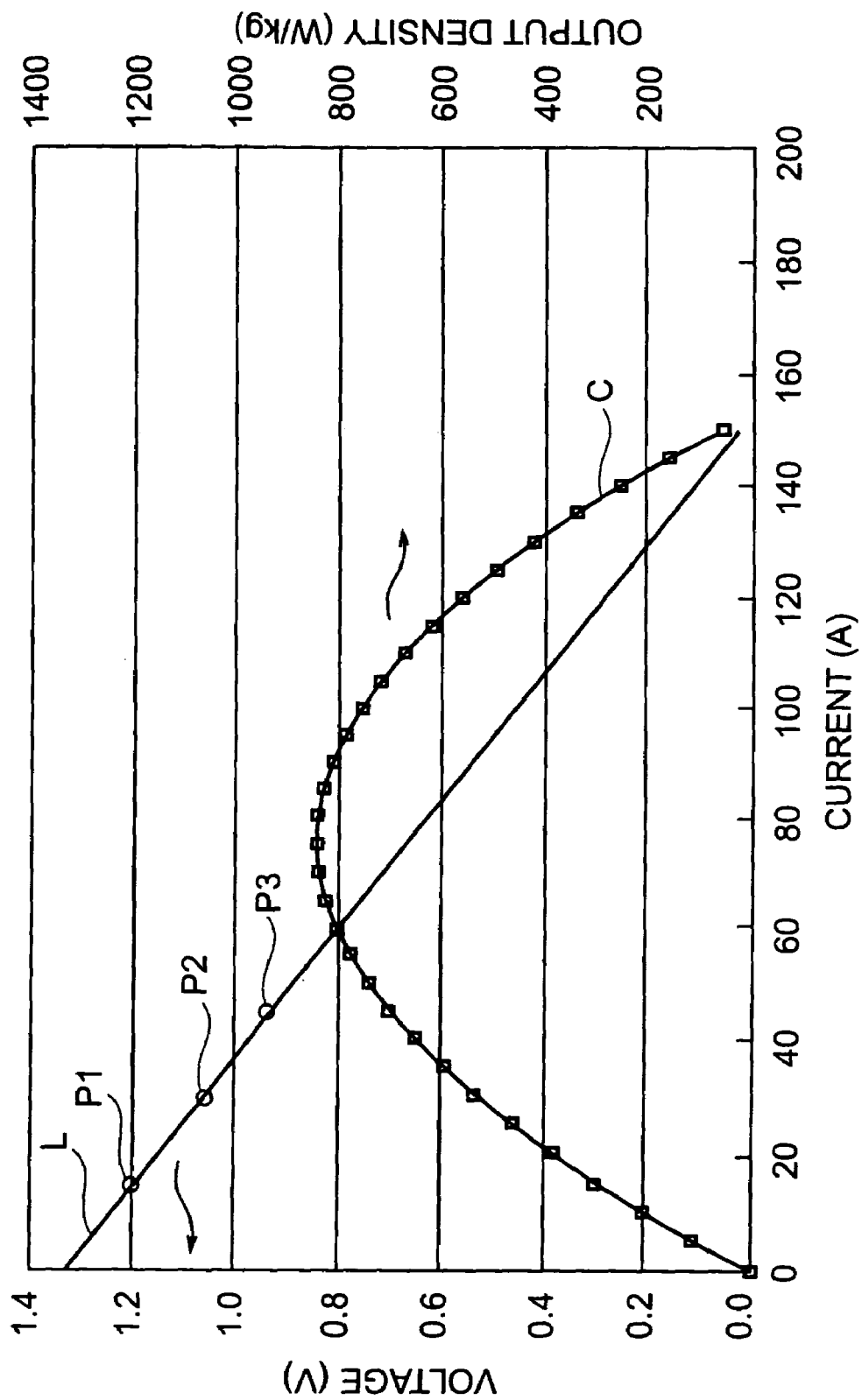
FIG. 4 shows a graph describing the method of calculating maximum output density.

FIG. 4 shows the results obtained from the above measured values. The point P1 having 5 C (current value: 15 A) as the X coordinate and the voltage at 10 seconds after starting discharge as the Y coordinate, the point P2 having 10 C (current value: 30 A) as the X coordinate and the voltage at 10 seconds after starting discharge as the Y coordinate, and the point P3 having 15 C (current value: 45 A) as the X coordinate and the voltage at 10 seconds after starting discharge as the Y coordinate, were plotted on the graph of FIG. 4, and an approximately straight line L of voltage change was obtained. Next, the voltage value (V, units: V) at every current value of 5 A was read from the approximately straight line L of this voltage change, and the power density (O, units: W/kg) was computed from the following formula. Next, points having the current value (A, units: A) as the X coordinate and the power density O as the Y coordinate were plotted on the graph of FIG. 4, respectively, and an approximated curve C of power density change was obtained.

$$O = A \cdot V/B \text{ ($B$ is battery mass (kg))}$$

Next, the working voltage range of the nickel-hydrogen battery was set to 0.8 V-1.5 V, the current range corresponding to that range was read from the approximately straight line L of voltage change, and the maximum power density O in that current range was read from the approximated curve C of output density change. Table 1 shows the result of maximum output density obtained by this.

TABLE 1

|  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Specific surface area per unit volume (m$^2$/cm$^3$) | 0.19 | 0.13 | 0.35 | 0.12 | 0.36 | 0.03 | 0.04 |
| Nickel plating amount (g/m$^2$) | 115 | 115 | 115 | 115 | 115 | 450 | 350 |
| Void ratio (%) | 83 | 87 | 80 | 88 | 70 | 97 | 36 |
| Filling density (%) | 1.86 | 1.97 | 1.42 | 1.91 | 1.31 | 1.83 | 0.44 |
| Theoretical capacity (mAh) | 3400 | 3600 | 2600 | 3500 | 2400 | 3600 | 800 |
| Maximum output density (W/kg) | 820 | 750 | 980 | 650 | 520 | 650 | 200 |

As is clear from Table 1, in Comparative Example 1, wherein the specific surface area per unit volume is less than 0.13 m$^2$/cm$^3$, the filling amount of the active substance increases and the theoretical capacity increases, but since the specific surface area per unit volume is small, the maximum output density falls to 650 W/kg.

In Comparative Example 2, wherein the specific surface area per unit volume exceeds 0.35 m$^2$/cm$^3$, the structure of the current collector has minute structure and the void ratio is low, so the filling amount of the active substance is low, and the maximum output density falls to 520 W/kg.

In Comparative Example 3, wherein the prior art foam nickel is used as the current collector of the anode, the filling amount of the active substance is high and the theoretical capacity is high, but since the specific surface area per unit volume is small, the maximum output density falls to 650 W/kg.

In Comparative Example 4, wherein the nickel plating amount is large, the voids in the nonwoven fabric are small due to the nickel and the filling amount of the active substance decreases, so the theoretical capacity is low and the maximum output density falls to 200 W/kg.

On the other hand, in Examples 1-3 wherein the specific surface areas per unit volume are 0.13 m$^2$/cm$^3$-0.35 m$^2$/cm$^3$, the surface area per unit volume is large and the contact area with the active substance is large, so an alkaline battery of high capacity and having a high output of 700 W/kg or more can be manufactured.

It is clear from the above description of the present invention that various modifications are possible. Such modifications do not depart from the scope and spirit of the appended claims, and all modifications which are obvious to those skilled in the art are incorporated herein by reference.

What is claimed is:

1. An alkaline battery comprising:
   an electrode, said electrode having a current collector and an active substance filled in said current collector,
   said current collector including a nonwoven fabric fabricated from a plurality of fibers and a plated nickel film formed on said plurality of fibers,
   a specific surface area per unit volume of said current collector being 0.13 m2/cm3-0.35 m2/cm3.

2. The alkaline battery according to claim 1, wherein said electrode is obtained by filling said current collector with an active-substance paste having a viscosity of 0.3 Pa·s or less, and drying.

3. The alkaline battery according to claim 1, wherein said nonwoven fabric includes thick fibers having a fineness of 6.6 dtex or more, and thin fibers having a fineness of 1.5 dtex or less.

4. The alkaline battery according to claim 1, wherein said nonwoven fabric includes high Young's modulus fibers having a Young's modulus of 20 cN/dtex or more.

5. The alkaline battery according to claim 1, wherein a plating amount of said plated nickel film is 80 g/m2-150 g/m2.

6. A current collector comprising:
   a nonwoven fabric fabricated from a plurality of fibers, and
   a plated nickel film formed on said plurality of fibers,
   a specific surface area per unit volume being 0.13 m2/cm3-0.35 m2/cm3.

7. The current collector according to claim 6, wherein said nonwoven fabric comprises thick fibers having a fineness of 6.6 dtex or more, and thin fibers having a fineness of 1.5 dtex or less.

8. The current collector according to claim 6, wherein said nonwoven fabric includes high Young's modulus fibers having a Young's modulus of 20 cN/dtex or more.

9. The current collector according to claim 6, wherein a plating amount of said plated nickel film is 80 g/m2-150 g/m2.

10. An electrode comprising a current collector and an active substance filled in said current collector,
    said current collector having a nonwoven fabric fabricated from a plurality of fibers and a plated nickel film formed on said plurality of fibers,
    a specific surface area per unit volume of said current collector being 0.13 m2/cm3-0.35 m2/cm3.

11. The electrode according to claim 10, wherein said electrode is obtained by filling said current collector with an active-substance paste having a viscosity of 0.3 Pa·s or less, and drying.

12. The electrode according to claim 10, wherein said nonwoven fabric comprises thick fibers having a fineness of 6.6 dtex or more, and thin fibers having a fineness of 1.5 dtex or less.

13. The electrode according to claim 10, wherein said nonwoven fabric includes high Young's modulus fibers having a Young's modulus of 20 cN/dtex or more.

14. The electrode according to claim 10, wherein a plating amount of said plated nickel film is 80 g/m2-150 g/m2.

15. A method of manufacturing an electrode comprising:

preparing a current collector having a nonwoven fabric fabricated from a plurality of fibers and a plated nickel film formed on said plurality of fibers, a specific surface area per unit volume of said current collector being 0.13 m2/cm3-0.35 m2/cm3, filling said current collector with an active-substance paste having a viscosity of 0.3 Pa·s or less, and drying said current collector filled with said active-substance paste.

* * * * *